United States Patent [19]

Hidaka

[11] Patent Number: 5,583,921
[45] Date of Patent: Dec. 10, 1996

[54] DATA TRANSMITTING/RECEIVING APPARATUS AND DATA COMMUNICATION SYSTEM

[75] Inventor: Shinji Hidaka, Oome, Japan

[73] Assignee: Casio Computer Co., Ltd., Tokyo, Japan

[21] Appl. No.: 123,644

[22] Filed: Sep. 17, 1993

[30] Foreign Application Priority Data

Sep. 21, 1992 [JP] Japan .................................. 4-277989
Sep. 21, 1992 [JP] Japan .................................. 4-277990

[51] Int. Cl.$^6$ ........................... H04M 11/00; H04M 1/00
[52] U.S. Cl. .......................... 379/93; 379/96; 379/57; 379/354
[58] Field of Search ...................... 379/93, 96, 97, 379/98, 99, 354, 355, 356, 57, 56; 340/825.44, 825.48; 345/121, 141, 123, 142

[56] References Cited

U.S. PATENT DOCUMENTS

| | | | |
|---|---|---|---|
| 4,646,081 | 2/1987 | Tsunada ................................. | 345/124 |
| 4,799,254 | 1/1989 | Dayton et al. ......................... | 379/97 |
| 4,885,771 | 12/1989 | Rabideau et al. ................... | 379/354 |
| 4,980,910 | 12/1990 | Oba et al. ............................. | 379/354 |
| 5,043,718 | 8/1991 | Shimura ............................. | 340/825.44 |
| 5,065,309 | 11/1991 | Putnam et al. ....................... | 379/96 |
| 5,095,307 | 3/1992 | Shimura et al. ..................... | 379/57 |
| 5,146,348 | 9/1992 | Kaneyama ........................... | 379/96 |
| 5,249,220 | 9/1993 | Moskowitz et al. ................. | 379/96 |

FOREIGN PATENT DOCUMENTS 403215891 9/1991 Japan ................................... 345/142

*Primary Examiner*—Jason Chan
*Attorney, Agent, or Firm*—Frishauf, Holtz, Goodman, Langer & Chick

[57] ABSTRACT

When receiving a conversion instruction from a key input section, a CPU reads character data stored in a message memory to a conversion buffer, converts the same into numeric data base on a conversion table, causes a tone signal generator to convert the same into a DTMF signal and outputs the signal to a speaker. When an input instruction of a registration designation and message number is received from the key input section, the CPU forms transmission data for sequentially storing the input information and the numeric data converted from character data in this order, causes to convert the same into the DTMF signal and outputs the signals. At the time of reception of the transmission data, the CPU identifies the content of the data, restores the numeric data into the character data based on an inverse conversion table, retrieves a message number from a TEL bank memory and registers a message into a memory area assigned to the number. With this construction, the troublesome operation of the user for converting the message sentence into numeric data and inputting the same can be omitted, addition and change of a message sentence of the reception side can be made on the transmission side, and the message transmitting function can be achieved by a combination with the telephone.

26 Claims, 15 Drawing Sheets

| CHARACTER CODE (4 BIT CODE) | CHARACTER | KEY TELEPHONE OPERATION |
|---|---|---|
| 0000 | 0 | 0 |
| 0001 | 1 | 1 |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 | (FREE MESSAGE CODE) | *7 |
| 1011 | U (URGENCY INDICATOR) | *0 |
| 1100 | SPACE | *2 |
| 1101 | — | *4 |
| 1110 | ] | *6 |
| 1111 | [ | *8 |

FIG.3

| ROW\COL. | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | : | ? | , | . |
| 7 | マ | ミ | ム | メ | モ | ァ | ィ | ェ | ォ | ッ |
| 8 | ヤ | ( | ユ | ) | ヨ | ャ | ュ | ョ | ― | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

FIG.4

| SHORTENED NO. (MESSAGE NO.) | TELEPHONE NO. INFORMATION (MESSAGE) | IDENTIFICATION INFORMATION |
|---|---|---|
| 01 | SHINJI HIDAKA<br>0425-12-1234 | |
| 02 | SHINJI HIDAKA<br>03-5123-1234 | P |
| 03 | ABC COMPUTER CO.<br>03-3777-0000 | |
| 04 | PAGER<br>0425-79-1111 | |
| 05 | OHISHI<br>0425-79-1111 | |

KEY 15b (b)

DATA TRANSMITTING/RECEIVING APPARATUS AND DATA COMMUNICATION SYSTEM

BACKGROUND OF THE INVENTION

1. Field of the Invention

The present invention relates to a data transmitting/receiving apparatus and a data communication system using a telephone network and, more particularly, to a data transmitting/receiving apparatus and a data communication system by which a common user can transmit message information including characters or consisting of characters to either a desired person or a desired place through the telephone network.

2. Description of the Related Art

As a data communication system using the telephone network, there are a radio paging system, a home banking system and the like. In these systems, a push-button telephone (hereinafter referred to as a "push-phone" or key telephone is a simple data transmitting apparatus which a common user can use easily. However, only ten numeric keys, i.e., 0 key to 9 key and two function keys, i.e., * key and # key are provided in the push-phone as operation keys so that only numeric data can be in principle transmitted by the push-phone. Therefore, when character data is transmitted from the push-phone, the key operations are performed in accordance with an agreement concluded between the transmitter side and the receiver side, in which each character corresponds to a different two-digit numeral combination, for example. When character data is actually input from the push-phone, the user must input numerals by key operation while referring to a predetermined matrix character arrangement table which stores the above agreement. As a result, a drawback that the inputting operation becomes troublesome occurs. Further, since the message is input by inputting numerals together with the telephone number or call number of the receiver side, it may become unclear to know the amount of numeral data which has been input in the course of the numeral inputting process. As a result, another drawback that numeral data tends to be erroneously input also occurs.

An auto-dialer can be used as an apparatus for simplifying the key operation of the push-phone. The auto-dialer outputs a tone corresponding to a DTMF (Dual Tone Multi-Frequency) signal which is a dial signal for the push-phone. Telephone number and so forth are in advance input by the operation of the numeric key and, when the user calls up on the telephone, the user couples the speaker of the auto-dialer which generates a tone of the DTMF signal to the transmitter of the handset of the push-phone to output the DTMF signal. Using the auto-dialer, the key operation of the push-phone can be extremely simplified. However, the above two drawbacks are not overcome when the telephone number and a message are set in the auto-dialer.

SUMMARY OF THE INVENTION

An object of the present invention is to provide a data transmitting apparatus by which a common user can simply transmit message information including characters or consisting of characters through the telephone network.

Another object of the present invention is to provide a data transmitting/receiving apparatus and a data communication system which can registers information such as a fixed-form message and a telephone number information prepared by a transmitter side into a memory area of a receiver side.

According to an aspect of the present invention, there is provided a data transmitting apparatus comprising: means for inputting character data; means for displaying a transmission message composed of the character data input by the inputting means; means for outputting data which are converted from the transmission message and corresponds the key operations upon inputting the message by a key telephone.

According to another aspect of the present invention, there is provided a data transmitting apparatus comprising: means for inputting character data for transmission message and a call number of a receiver side; means for storing the call number of receiver side and the character data for transmission message input by the inputting means; first converting means for converting the character data stored in the storing means into character code information based on a predetermined data conversion format; second converting means for converting the call number stored in the storing means and the character code information converted by the first converting means into a transmission signal based on a preset transmission data format; and means for outputting the transmission signal converted by the second converting means.

According to still another aspect of the present invention, there is provided a data transmitting apparatus comprising: means for inputting character data for transmission message and a call number of a receiver side; first converting means for converting the character data input by the inputting means into character code information based on a predetermined data conversion format; means for storing the call number of receiver side and the character code information converted by the first converting means; second converting means for converting the call number stored in the storing means and the character code information into a transmission signal based on a preset transmission data format; and means for outputting the transmission signal converted by the second converting means.

According to still another aspect of the present invention, there is provided a data transmitting apparatus comprising: means for inputting character data for transmission message; means for storing the character data for transmission message input by the inputting means; means for converting the character data stored in the storing means into character code information based on a preset data conversion format; means for displaying the character code information converted by the converting means and displaying a guidance for indicating key operations of a key telephone; and a key telephone connected to a public telephone network.

According to still another aspect of the present invention, there is provided a data receiving apparatus comprising: means for receiving a transmission signal which is transmitted from transmission means and composed of a call signal used for discretely/simultaneously calling a plurality of data receiving apparatus, preset character code information indicating a message sentence and registration designate information for designating registration of a message sentence into storing means by identifying the call signal; means for identifying the registration designate information and the character code information from the transmission signal receiving by the reception means; means for converting the character code information identified by the identifying means into a message sentence based on a preset data conversion format; and means for storing the message sentence converted by the converting means into a storage area according to the registration designate information identified by the identifying means.

According to still another aspect of the present invention, there is provided a data communication system comprising a plurality of data transmitting apparatuses and a plurality of data receiving apparatuses, each of the data transmitting apparatuses includes: means for inputting a call signal for discretely/simultaneously calling the plurality of data receiving apparatuses, registration designate information for designating registration of a message sentence into storing means of the data receiving apparatus, and the message sentence; first converting means for converting the message sentence input by the inputting means into character code information based on a preset data conversion format; and second converting means for converting the call signal, the registration designate information input by the inputting means and the character code information converted by the first converting means based on a preset transmission format, and transmitting converted data as a transmission signal; and of the data receiving apparatuses includes: means for receiving a call signal transmitted by one of the data transmitting apparatuses; means for identifying the registration designate information and the character code information from the transmission signal received by the receiving means; means for inversely converting the character code information identified by the identify-ing means into a message sentence according to the preset data conversion format; and means for storing a message sentence inversely converted by the inversely converting means into a registration area of a memory based on the registration designate information identified by the identifying means.

In the data transmitting apparatus of the present invention, since character code information can be obtained by means of automatic conversion by simply inputting character data, a troublesome operation by the user for inputting numerals while referring to the conventional character arrangement table can be omitted, and occurrence of the erroneous inputting operation can be suppressed, and the inputting operation of transmission message by the user can be simplified. Transmitted registration designate information includes registration position information and a message can be stored in a storage area of the data receiving apparatus specified by the registration position information. Therefore, it becomes possible to freely add data to or change a message sentence registered in the data receiving apparatus by transmitting registration designate information to the data receiving apparatus. Further, it is possible to freely add data to or change the message sentence registered in the data receiving apparatus by use of registration designate information. As a result, it becomes possible to add the message transmitting function and more convenient message registration function to a pager by applying the data receiving apparatus and data communication system of the present invention to the receiver terminal such as the pager. Further, by converting the call signal, registration designate information and numeric data into the DTMF signal, it becomes possible to easily transmit a message to a communication terminal of the receiver side and freely register the message by simply generating the DTMF signal from the transmitter/ receiver. As a result, it becomes possible to add the message transmission function to a pager by applying the data communication system of the present invention to the receiver terminal such as the pager. Further, the displaying means can display an input call number, character data and converted numeric data can also display the input guidance for the respective data items. Therefore, a message can be transmitted to a communication terminal of receiver side by simply operating the push buttons of the key telephone based on the numeric data which is converted from the input character data and whose input guidance is displayed, the troublesome operation of depressing numeral keys while referring to the conventional character arrangement table can be omitted, and occurrence of the erroneous input operation can be suppressed, thereby making the input operation of the transmission message by the user easy. In this case, if the displaying means displays the respective data items with the display range divided into predetermined areas when displaying the input guidance, the user can be clearly informed of the input range of numeric data which is now input, occurrence of the erroneous input operation can be suppressed without fail, the operability of inputting numeric data and reliability thereof can be significantly enhanced, and the utility of the message service in the pager or the like can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the present invention, and together with the general description given above and the detailed description of the preferred embodiment given below, serve to explain the principles of the present invention.

FIG. 3 is a diagram showing character codes corresponding to key operations of the key telephone;

FIG. 4 is a diagram showing a matrix character arrangement table stored in a conversion table and an inverse conversion table of FIG. 2;

FIG. 8 is a diagram showing a memory area structure of a TEL bank memory of FIG. 2;

DETAILED DESCRIPTION OF THE PREFERRED EMBODIMENTS

There will now be described embodiments of the present invention with reference to the accompanying drawings.

Figure 1:
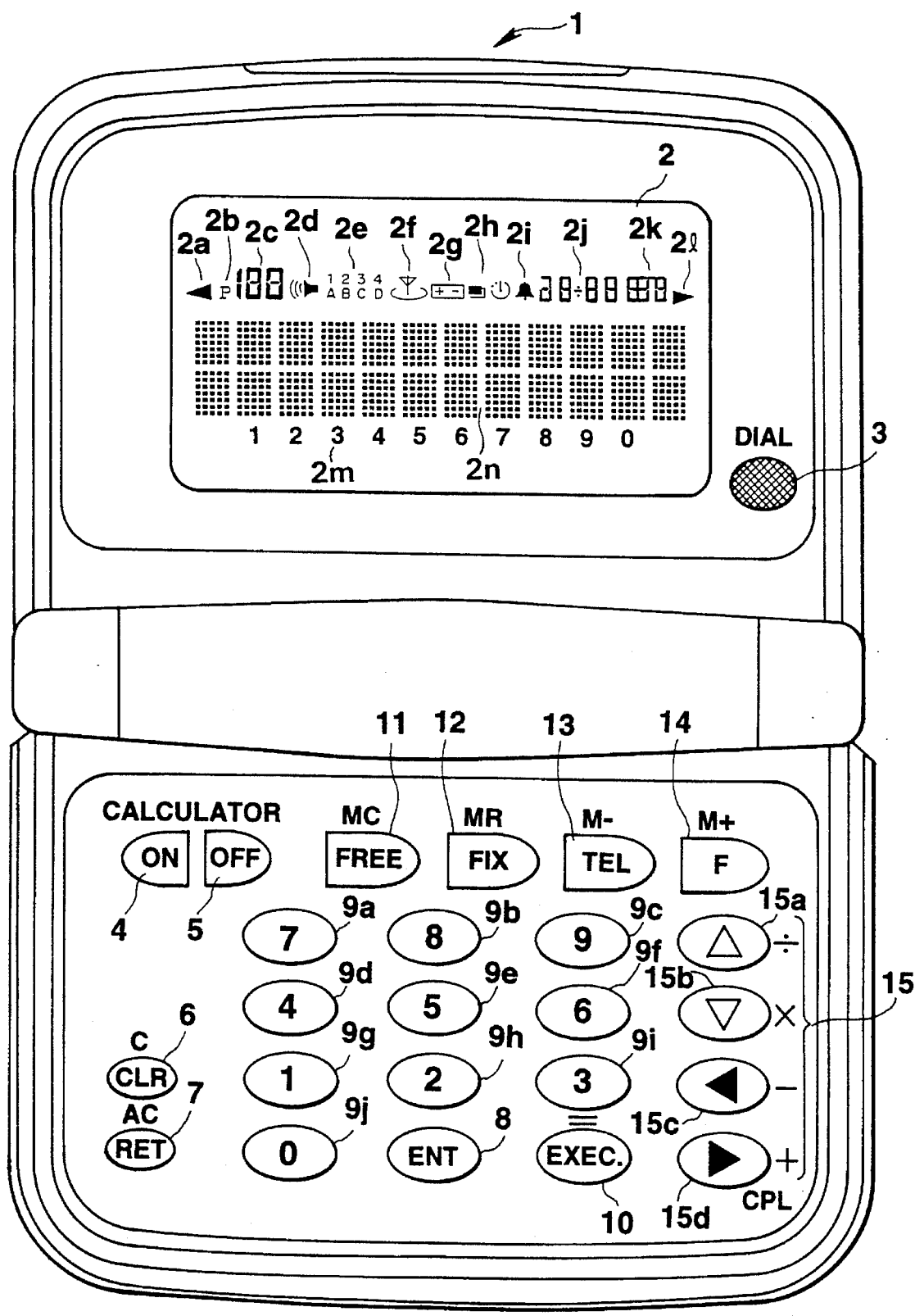
FIG. 1 is a view illustrating the external appearance of a data transmitting/receiving apparatus according to the first embodiment of the present invention.

FIG. 1 is a view illustrating the external appearance of the data transmitting/receiving apparatus according to the first embodiment of the present invention. In the example of FIG. 1, the present invention is applied to a pager 1. The pager 1 includes a liquid crystal display section 2, dial key 3, ON key 4, OFF key 5, clear key 6, return key 7, enter key 8, numeral keys 9a to 9j, execution key 10, free message key 11, fixed-form message designate key 11, TEL bank mode designate key 13, the function key 14, cursor keys 15, and the like. On the side portion of the pager 1, a power switch and small holes which pass sounds generated by the speaker (both not shown) are formed. According to the input operation by various keys, the liquid crystal display section 2 displays necessary character information, mode information indicating the operation mode, numeral information subjected to the conversion process, and the like. In the liquid crystal display section 2, representations 2a and 2l are respectively indicate that display data is present in the front page and that display data continues to the next page, 2b indicates a protect, 2c indicates a bank number in which a message displayed is stored, 2d indicates a selected sound volume, 2e indicates a number corresponding to the address and a function corresponding to the function bit of address data, 2f indicates an out-of-range mark which flashes on and off when a synchronization signal is not supplied for a preset period of time, 2g displays a low voltage of a battery, 2h is a re-calling representation which is lit when the same data as received data is present in memory bank data, 2i is an alarm, 2j displays hours and minutes or month and date, 2k displays a day of the week, 2m indicates a guidance number for character input displayed at the time of data input, and 2n is a data representation for displaying a message at the time of data reception or the like and displaying data, menu, comment etc. for each mode. The dial key 3 is used as a dial tone output instruction key. The power switch is used to selectively set the ON/OFF state of the power source and the ON/OFF state of ringing sounds at the time of data reception. The ON and OFF keys 4 and 5 designate respectively the ON/OFF state of the desk calculator function. The clear key 6 designates erasing of character information which is now input. The return key 7 designates completion of each mode process and the like. The input key 8 designates a registration of key input data in memories. Numerical keys 9a to 9j designate input of numerals and designate input of kana characters and alphabets, as described later. The execution key 10 designates execution of each mode. The free message key 11 is used to set a "message formation mode". The fixed-form message key 12 is used to set a mode displaying the fixed-form messages stored in a message memory 33 described later. The TEL bank mode designating key 13 is used to set a "TEL bank mode". The function key 14 is used to set another modes such as fixed-form message transmission mode, message registration transmission mode, time correction mode. The cursor keys 15a to 15d designate the selection of kana-alphanumeric characters and input positions thereof. In particular, the cursor keys 15a and 15b are used to select character groups in the message formation mode and the cursor key 15d designates the connection of the input message to the pager TEL number, as will be described later.

Figure 2:
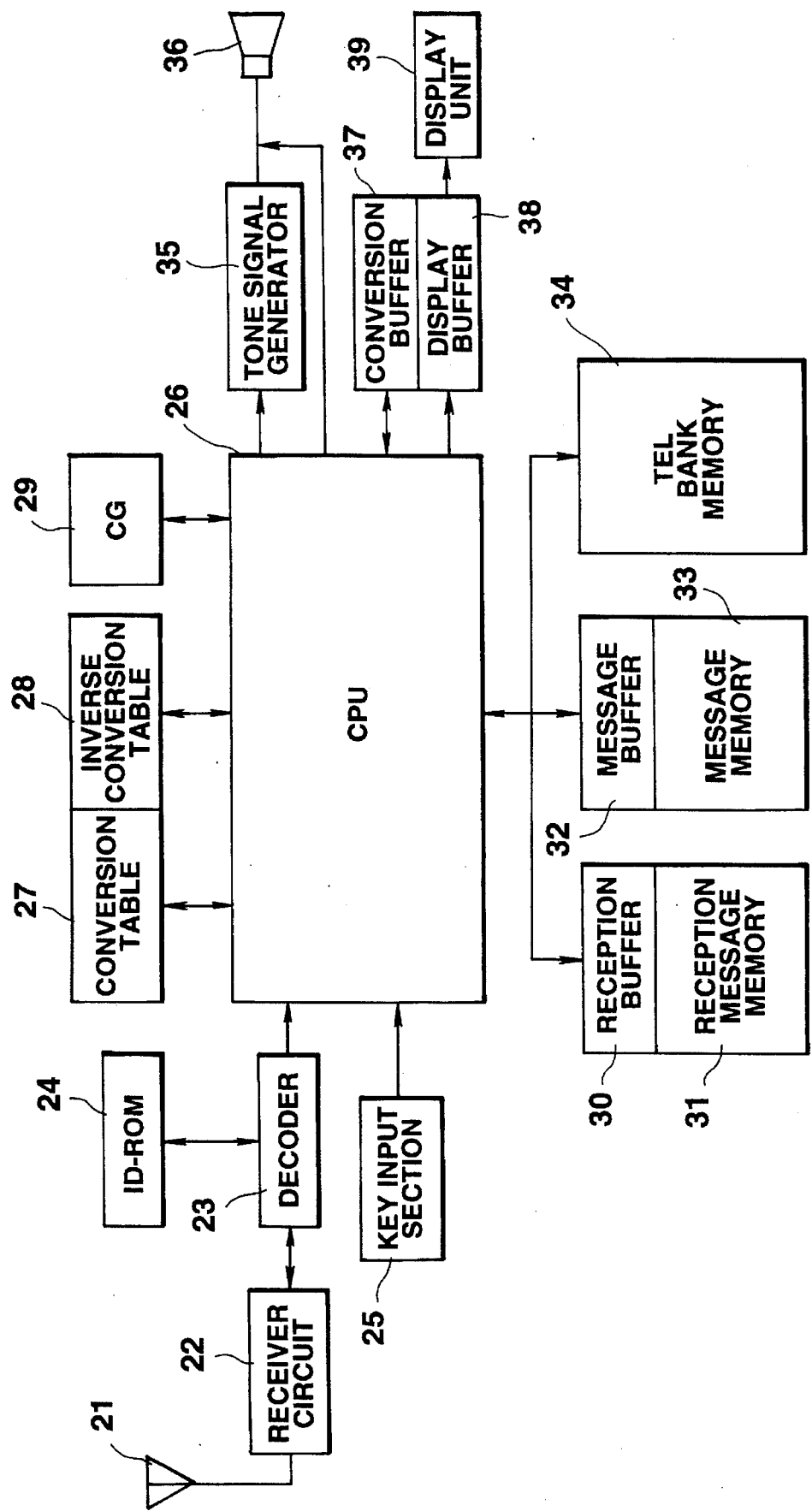
FIG. 2 is a block diagram showing the construction of the apparatus of FIG. 1.
Figure 5:
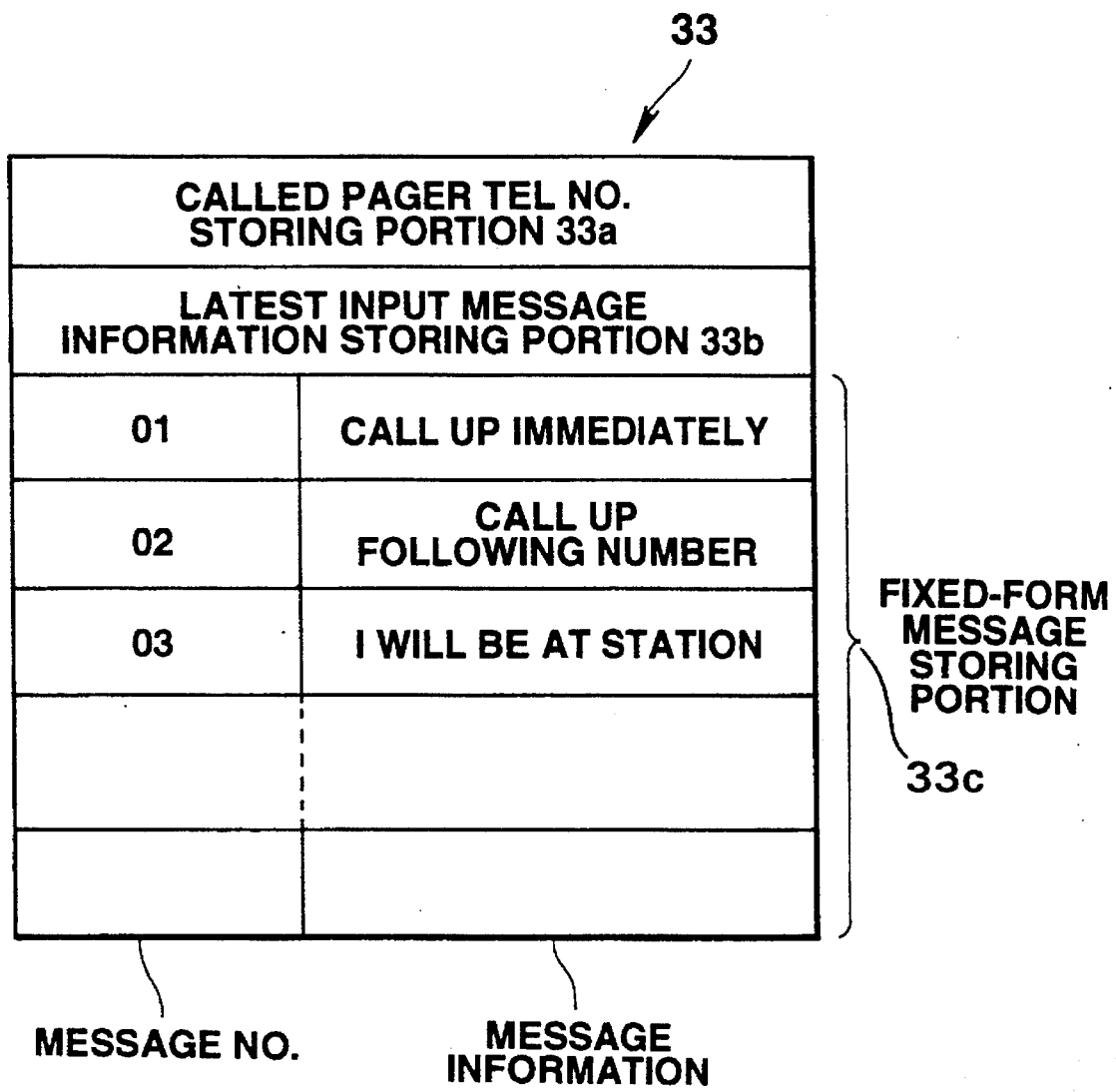
FIG. 5 is a diagram showing a memory area structure of a message memory of FIG. 2.
Figure 6:
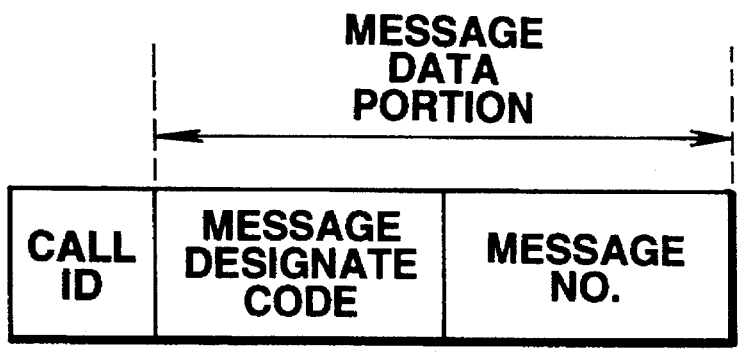
FIG. 6 is a diagram showing a format of message information including a message designate code.
Figure 7A:
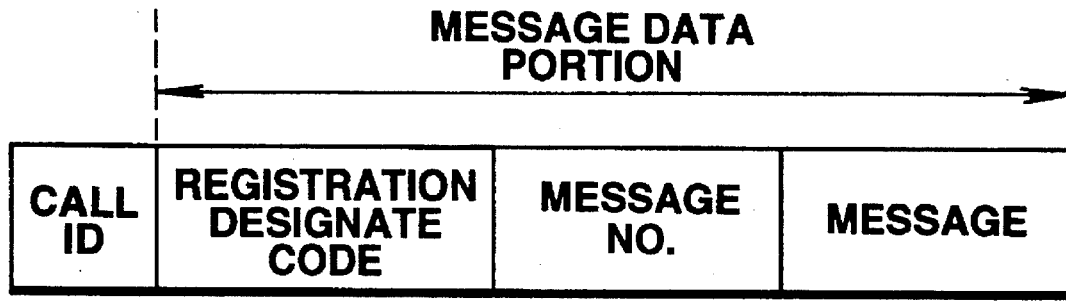
FIGS. 7A and 7B are diagrams both showing formats of message information including registration designate code and free message code, respectively.

FIG. 2 is a block diagram showing the construction of the pager of FIG. 1. The pager 1 includes an antenna 21, a receiver circuit 22, a decoder 23, an ID-ROM 24, a key input section 25, a CPU 26, a conversion table 27, an inverse conversion table 28, a character generator (CG) 29, a reception buffer 30, a reception message memory 31, a message buffer 32, a message memory 33, a TEL bank memory 34, a tone signal generator 35, a speaker 36, a conversion buffer 37, a display buffer 38 and a display unit 39. The antenna 21 receives a call signal transmitted by radio from a pager service company (not shown) or the like and outputs the same to the receiver circuit 22. The receiver circuit 22 is controlled by an intermittent signal input from the decoder 23, intermittently receives a call signal input from the antenna 21, amplifies and demodulates the received signal and outputs a demodulated signal to the decoder 23. The decoder 23 determines whether the call ID of the call signal input from the receiver circuit 22 coincides with a self-identification number by referring to the ID-ROM 24 in which the identification number is previously registered. If they coincide with each other, the decoder 23 makes the receiver circuit 22 continuously receive the signal and outputs a call detection signal to the CPU 26. The decoder 23 also outputs to the CPU 26 message information which are received by above continuous reception of the signal. In this embodiment, as shown in FIG. 3, each character code composing the message information is a 4-bit code and all character codes can be input by the key operation of the key telephone. The key input section 25 includes various keys shown in FIG. 1 and outputs an instruction input by the operation of each key. The conversion table 27 stores the matrix character arrangement table shown in FIG. 4 and is used when character data is converted into numeric data. For example, a character "エ" is converted into numeric data (14) and a character "ヲ" is converted into numeric data (71). The inverse conversion table 28 stores the matrix character arrangement table for effecting the inverse conversion of the conversion table 27 to convert combination data of two-digit numerals into character data and is used when the numeric data is converted into the character data. The character generator 29 generates a plurality of character patterns to be displayed on the display unit 39 in response to a request from the CPU 26 and supplies the same to the CPU 26. The reception buffer 30 provides a memory area for temporarily storing reception message information transferred between the CPU 26 and the reception message memory 31. The reception message memory 31 includes a plurality of memory banks and stores every reception message information input from the CPU 26 via the reception buffer 30. The message buffer 32 provides a memory area for temporarily storing message information transferred between the CPU 26 and the message memory 33. The message memory 33 comprises of a telephone number storing portion 33a, a latest input message information storing portion 33b, and a fixed-form message storing portion 33c having a plurality of memory banks, as shown in FIG. 5. The message memory 33 stores message information input from the CPU 26 via the message buffer 32 into both the latest input message storing portion 33b and the fixed-form message storing portion 33c. The fixed-form message storing portion 33c stores message information displayed on the display unit 39 instead of received message information if the received message information transmitted following to the self-call ID number is composed of message designate code and message number, as shown in FIG. 6. If the received message information is composed of registration designate code, message number and message, as shown in FIG. 7A, the received message information is also stored in the fixed-form message storing portion 33c, as described in detail later. The TEL bank memory 34 has a plurality of memory banks shown in FIG. 8 and stores telephone number information input from the CPU 26 together with the shortened number and identification flag "P" of the pager. The tone signal generator 35 converts numeric data input from the CPU 26 into the DTMF signal and outputs the same from the speaker 36. The conversion buffer 37 provides a memory area for temporarily storing reception message information read from the reception message memory 31 by the instruction from the CPU 26. The display buffer 38 provides a memory area for temporarily storing character data and numeric data to be displayed output from the CPU 26 to the display unit 39.

The CPU (Central Processing Unit) 26 includes a ROM (Read Only Memory) for storing various control programs, timer, input register for holding instruction according to key input operations of the key input section 25. The CPU 26 executes processes as the pager 1 based on the various control programs stored in the ROM. When receiving the call detection signal from the decoder 23, the CPU 26 outputs an informing signal to the speaker 36 to inform occurrence of a call and makes the reception message memory 31 store reception message information successively input from the decoder 23 through the reception buffer 30. Further, the CPU 26 stores the message information input from the key input section 25 into the message memory 33 via the message buffer 32, and, at the same time, stores telephone number information input from the key input section 25 into the TEL bank memory 34. Further, when input of character data such as kana, alphanumeric data is instructed by the key input section 25, the CPU 26 reads a character pattern corresponding to the input instruction from the character generator 29 and causes the read data to be stored into the display buffer 38 and displayed on the display unit 39. When receiving the dial tone output instruction from the key input section 25 by the operation of the dial key 3, the CPU 26 cause the speaker 36 to output the dial tone corresponding to the telephone number information and the message information. More particularly, in case of the message information, the CPU 26 reads the character data of the message information stored in the message memory 33 to the conversion buffer 37, converts the read character data into the numeric data (character code) based on the conversion table 27, causes the tone signal generator 35 to convert the numeric data as well as two-digit numeric data "*7" (this data indicates a free message code) added to the head portion of the numeric data into the DTMF signal and the speaker 36 to output the DTMF signal. Further, the CPU 26 contains a timer circuit therein, displays time on the liquid crystal display section 2 and sets an alarm time by use of the timer circuit. Further, when the CPU 26 receives the dial tone output instruction, after receiving from the key input section 25 an instruction for setting the message registration transmission mode wherein message information stored in the fixed-form message storing position 33c is stored into the fixed-form message storing portion of the destination pager, it generates a transmission of data having four-digit numeric data "*6*6" indicating a registration designate code "つつ", selected message number and the numeric data converted from the character data of the message information in this order. Thus, the call signal shown in FIG. 7A can be output from a radio base station of a paging service company which described later. The CPU 26 then causes the tone signal generator 35 to convert the transmission data into the DTMF signal and the speaker 36 to output the DTMF signal. When the CPU 26 receives the dial tone output instruction, after receiving from the key input section 25 an instruction for setting the fixed-form message transmission mode, it generates transmission data having four-digit numeric data "*8*8" indicating a message designate code "cc" and key input message number and causes the speaker 36 to output the transmission data, as described above. As a result, the call signal shown in FIG. 6 can be transmitted from the radio base station of the paging service company. When the CPU 26 receives a transmission signal having message information added thereto after a call ID, it retrieves the registration designate code by the reception data process as will be described later. If the registration designate code is retrieved, a memory area for the message information is set according to the message number in the message memory 33 or the TEL bank memory 34, and the CPU 26 registers the message information into the memory area. Further, CPU 26 effects a process for a key telephone operation guidance mode wherein the character data of the message information is converted into the numeric data in the same manner as in the dial tone output, and the converted numeric data is displayed via the display buffer 38, as will be described later, when an instruction of character/numeral conversion is supplied by the operation of the execution key 10 of the key input section 25 while message information consisting of the character data is displayed on the display unit 39.

Next, the operation of the first embodiment of the present invention will be explained.

Figure 9:
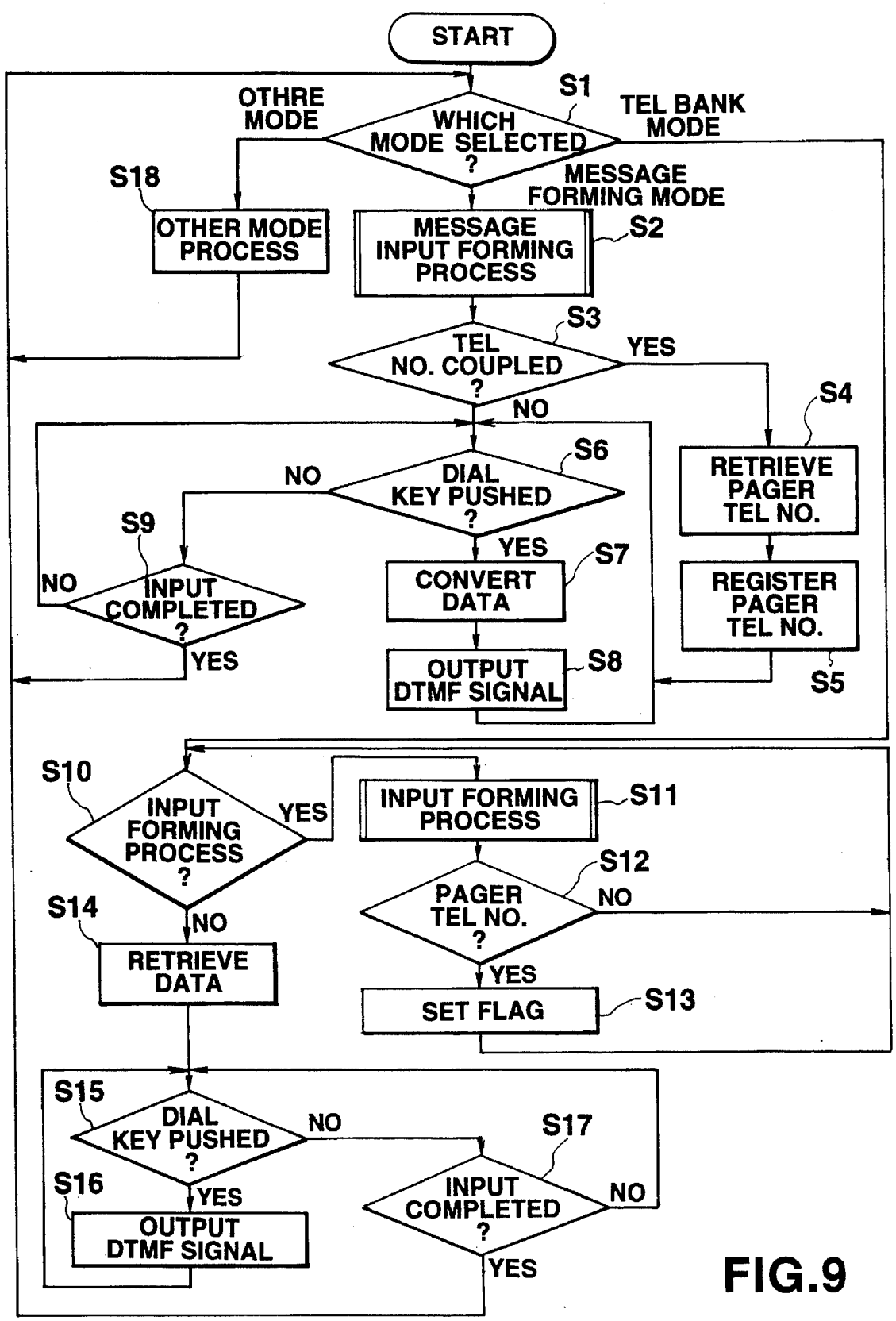
FIG. 9 is a flowchart for illustrating message information and telephone number information processing operations effected by the pager of the first embodiment.
Figure 10:
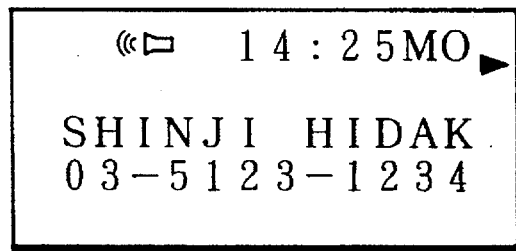
FIG. 10 is a diagram showing display examples of the retrieval of a pager call number retrieved in the inputting/ forming process of telephone number information of FIG. 9.
Figure 10:
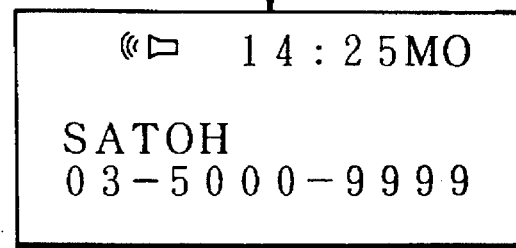
Figure 11:
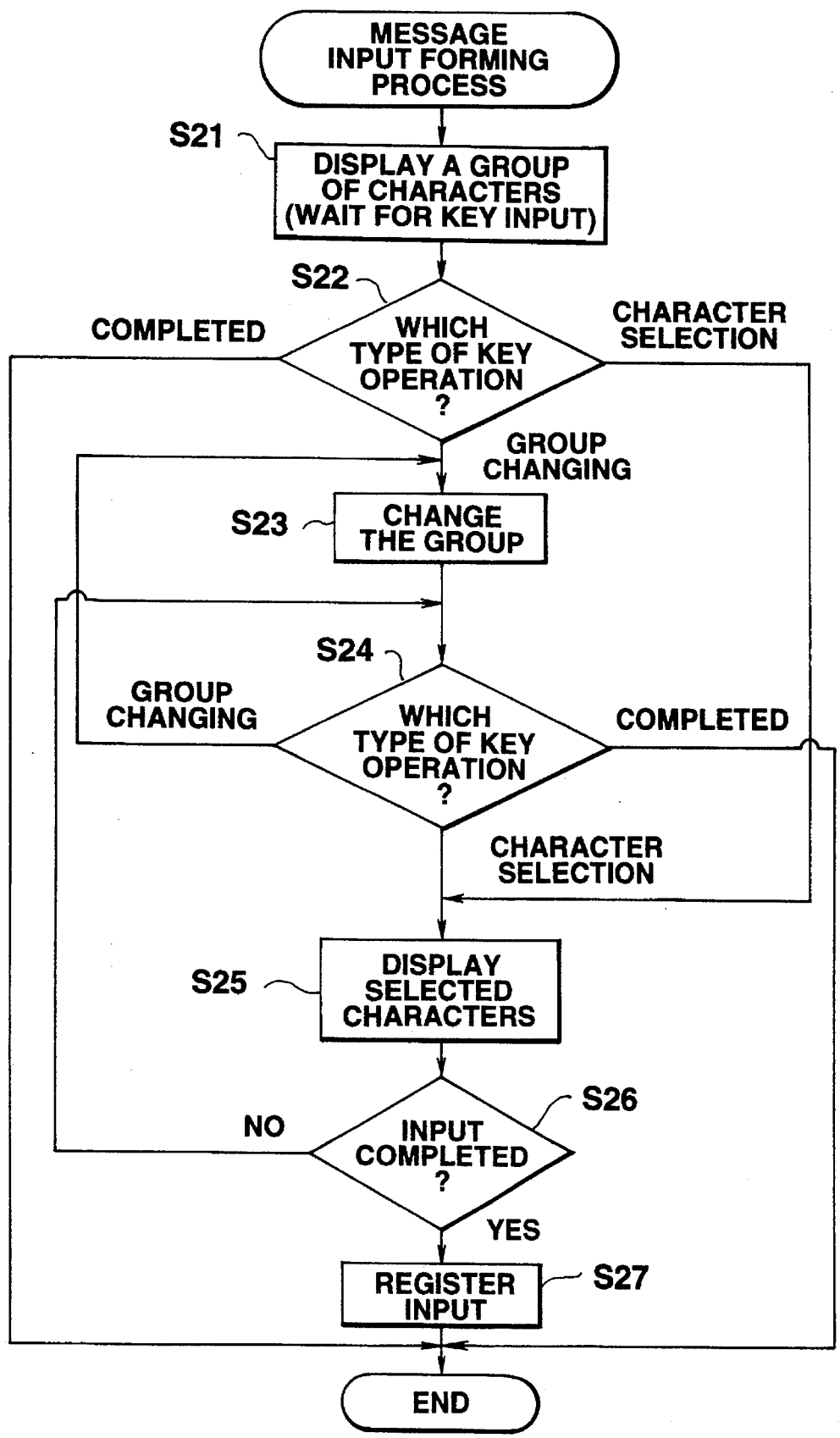
FIG. 11 is a flowchart for illustrating message information and telephone number information inputting/forming processes effected by the pager of the first embodiment.
Figure 12:
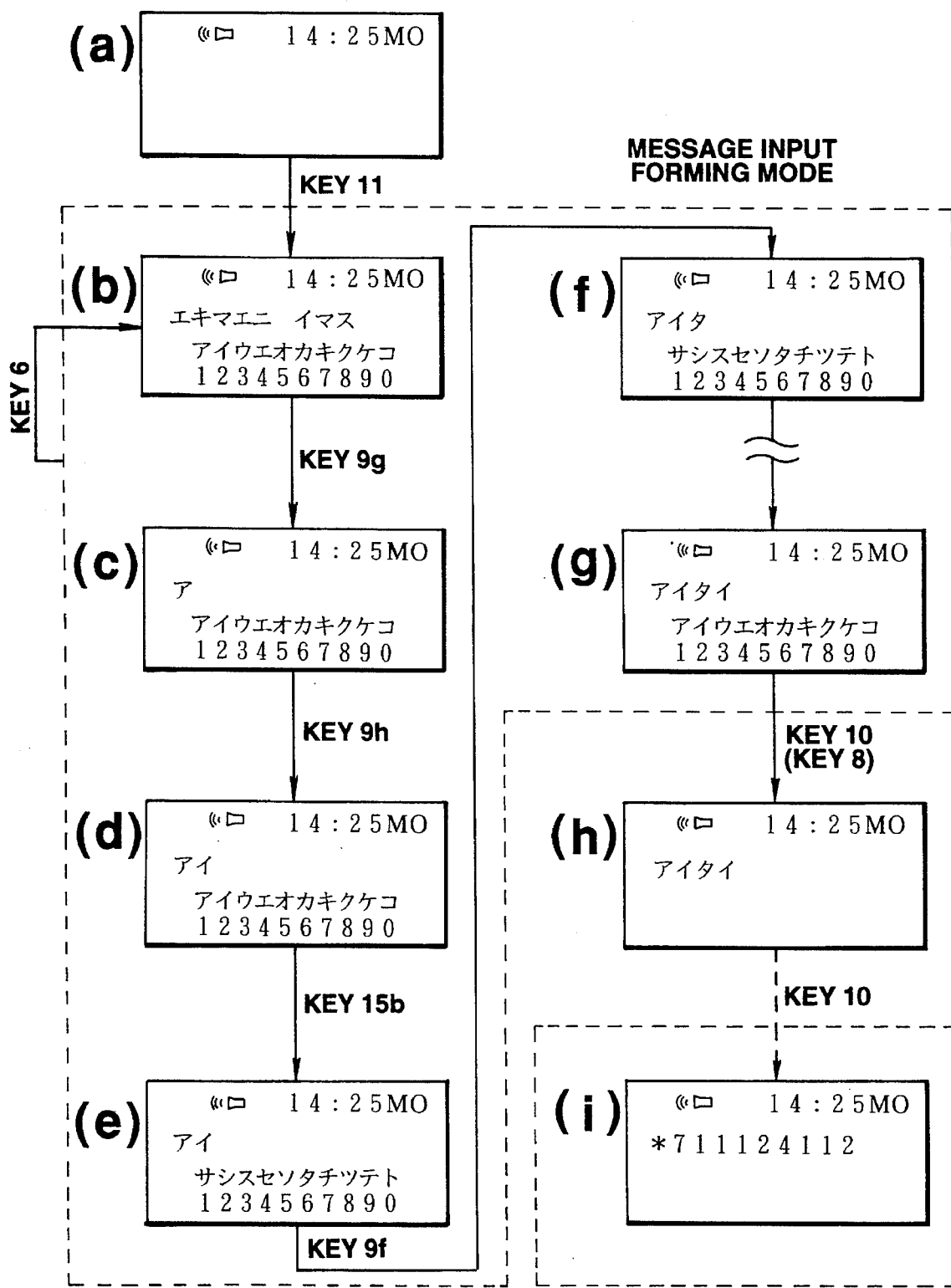
FIG. 12 is a diagram showing an example of data conversion display of message information displayed on a liquid crystal display section by the message information and telephone number information processing operations of FIG. 9.

FIG. 9 is a flowchart for illustrating the operation effected by the pager of the first embodiment for processing message information and telephone number information. When a mode is selected by operating the mode key such as the free message key 11, the TEL bank key 13 of the pager 1, it is checked which mode is selected (step S1). First, if the message forming mode is selected, the message input forming process as will be described later with reference to FIGS. 11 and 12 is effected (step S2). when the message input forming process is completed, it is checked whether a request for coupling the formed message to the telephone number of the receiver side (the pager call number) is selected. When the coupling request is selected by the cursor key 15d, only the telephone number having the pager identification flag "P" is retrieved according to the stored contents of the TEL bank memory 34 shown in FIG. 8, and displayed shown in FIG. 10(a). Under this condition, if the cursor key 15d is operated, another telephone number whose pager identification flag "P" is registered is further retrieved and displayed as shown in FIG. 10(b) (step S4). Thus, a corresponding pager call number is selected and registered into the telephone number storing portion 33a of the message memory 33 by the operation of the execution key 10

Figure 7B:
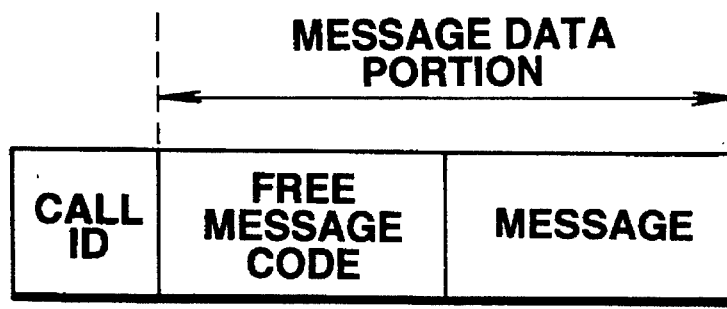

(step S5). On the other hand, when the coupling request is not selected, and when registration of the pager call number into the message memory 33 is completed, an input by the dial key 3 is waited (step S6). If the dial key 3 is operated when the coupling request is not selected, the CPU 26 reads out registered message information from the latest input message information storing portion 33b of the message memory 33, converts the character data of the message into the numeric data based on the matrix character arrangement table of the conversion table 27 shown in FIG. 4 (step S7), and causes the tone signal generator 35 to convert the converted numeric data following to two-digit numeric data "*7" indicating a free message code into the DTMF signal and output the same from the speaker 36 (step S8). Thus, the call signal shown in FIG. 7B can be transmitted from the radio base station of the paging service company. On the other hand, if the dial key 3 is operated after the registration of the pager call number into the message memory 33 is completed, the pager call number stored in the telephone number storing portion 33a of the message memory 33 is converted into the DTMF signal by the tone signal generator 35 and is output from the speaker 36 (step S8). When an output of the call number, that is, dialing of the call number is completed (step S8), the process returns again to the step S6 and it is again checked whether the dial key 3 is operated. When the dial key 3 is operated again, message information is converted into the numeric data in the same manner as described above (step S7) and the numeric data "*7" and the converted message information are converted into the DTMF signal by the tone signal generator 35 and then output from the speaker 36 (step S8), and then the waiting state for input of the dial key 3 is set (step S6). while, if it is detected in the step S6 that the dial key 3 is not operated, whether the input completion is instructed by the return key 7 is checked (step S9). When the completion of input is not detected, the waiting state for input of the dial key 3 is set (step S6). When the completion of input is detected, the decision process of the selection mode of the step S1 is effected.

When the TEL bank mode is selected in the step S1 of FIG. 9, it is checked whether either the input forming mode of data registered into the TEL bank memory 34 or the retrieval mode is selected (step S10). This mode selection is designated by selecting one of two mode menus displayed on the display unit 39, i.e., data input forming mode and data retrieving mode, for example, by the key operation. When the data input forming mode is selected, the data input forming process is effected in the same manner as the input forming process shown in the step S2 (step S11). In the input mode, a name and a telephone number can be registered up to twelve figures and twenty figures, respectively. When the input forming process is completed, it is checked based on telephone number data whether the input telephone number is the telephone number or the pager call number (step S12). When the telephone number is selected, it is registered into the TEL bank memory 34 and the process is returned to the waiting state for mode selection of the step S10. On the other hand, when the pager call number is selected, it is registered into the TEL bank memory 34 and the pager identifying flag "P" is set (step S13) and the process is returned to the waiting state for mode selection of the step S10. When the retrieving mode is selected in the step S10, the retrieving process for data of FIG. 8 registered in the TEL bank memory 34 is effected according to the retrieving condition designated by the key input data, for example, one of shortened number, name, telephone number and pager identifying flag (step S14). When the retrieving process is completed, an input instruction for the dial key 3 is waited for (step S15). When the dial key 3 is not operated, whether the completion is designated by the return key 7 is checked (step S17). When the completion is not instructed by the return key 7, the process is returned to the state of waiting for input of the dial key 3 of the step S15. When the completion is instructed, the mode selection decision process of the step S1 is effected. If it is detected in the step S15 that the dial key 3 is operated, only the registered telephone number is converted into the DTMF signal by the tone signal generator 35 and output from the speaker 36 (step S16). Then the process is returned to the state of waiting for input of the dial key 3.

FIG. 11 is a flowchart for illustrating the message input forming process of the step S2 in FIG. 9. FIG. 12 is a diagram showing examples of display on the liquid crystal display section 39 according to the message input forming process of FIG. 11. As shown in FIG. 12(a), in the initial condition in which mode information of the alarming mode and present time are displayed on the liquid crystal display section 39, when the message input forming mode is selected by the free message key 11, message information formed in the preceding cycle is read from the latest input message information storing portion 33b of the message memory 33 and displayed. A character series of "ア" column and "カ" column, for example, is displayed as the input character series group display, as shown in FIG. 12(b), and the key input is waited (step S21). Under this condition, whether the next key input operation is the group changing operation by the cursor keys 15a, 15b, character selecting operation by the numeric keys 9a to 9j or completion by the return key 7 is checked (step S22). In the case of character selection, the selected character is displayed on the liquid crystal display section 39 (step S25). When the completion is instructed, the message input forming process is completed. In the case of group changing operation, the group display on the liquid crystal display section 39 is changed (step S23). Next, whether the key input operation is the group changing operation, character selecting operation or completion is checked again (step S24). In the case of group changing operation, the process is returned to the step S23 and the group changing display is effected again. In the case of character selection operation, the selected character is displayed on the liquid crystal display section 39 (step S25). Then, whether the completion by the execution key 10 is checked (step S26). If the input completion is not instructed, the process of the steps S23 to S25 is repeatedly effected. If the input completion is instructed, the resultant message information is registered into the latest input message storing portion 33b of the message memory 33 (step S27), and the message input forming process is completed. The resultant message information can be stored in not only the latest input message storing portion 33b but also the fixed-form message storing portion 33c by designating the input completion by the enter key 8. The resultant message information can be stored in an empty bank of the fixed-form message storing portion 33c using an empty bank number as the message number, for example. Further, the message input forming process is also completed when the completion is instructed in the step S24. After this, the process including the step S3 and the succeeding steps shown in FIG. 9 is effected.

Referring to FIG. 12, the message input forming process will be described in detail. In the initial display of the message input forming process shown in FIG. 12(b), if "1" is input by operating the numeric key 9g, for example, "ア" in the character series is input and displayed and the preceding message display is cleared (FIG. 12(c)). Then, if "2" is input by operating the numeric key 9h "イ" in the character series is input and displayed (FIG. 12(d)). Then, the "ア" and "ヤ" columns are displayed by scrolling the character series group display by operating the cursor key 15b (FIG. 12(e)). Next, if "6" is input by the numeric key 9f, "ヤ" in the character series is input and displayed (FIG. 12(f)). "イ" is input and displayed by effecting the same key operation (FIG. 12(g)), and the input of message of "アイヤイ" (I wish to see you) is registered into the message memory 33 by finally operating the execution key 10 or the input key 8 and displayed on the display unit 39 (FIG. 12(h)). Thus the message forming process is completed. Under this condition, if the execution key 10 is operated, the key operation guidance mode for the key telephone described later is introduced. The character data is converted into the numeric data according to the matrix character arrangement table stored in the conversion table 27 and the result of conversion is displayed (FIG. 12(i)). In the display of the conversion result "*711124112" shown in FIG. 12(i), two-digit figures of "*7", indicate two keys "*" and "7" of the key telephone for instructing the free message code and eight digit numerals "11124112" indicate the numeric key operation for transmitting the message "アイヤイ".

Figure 13:
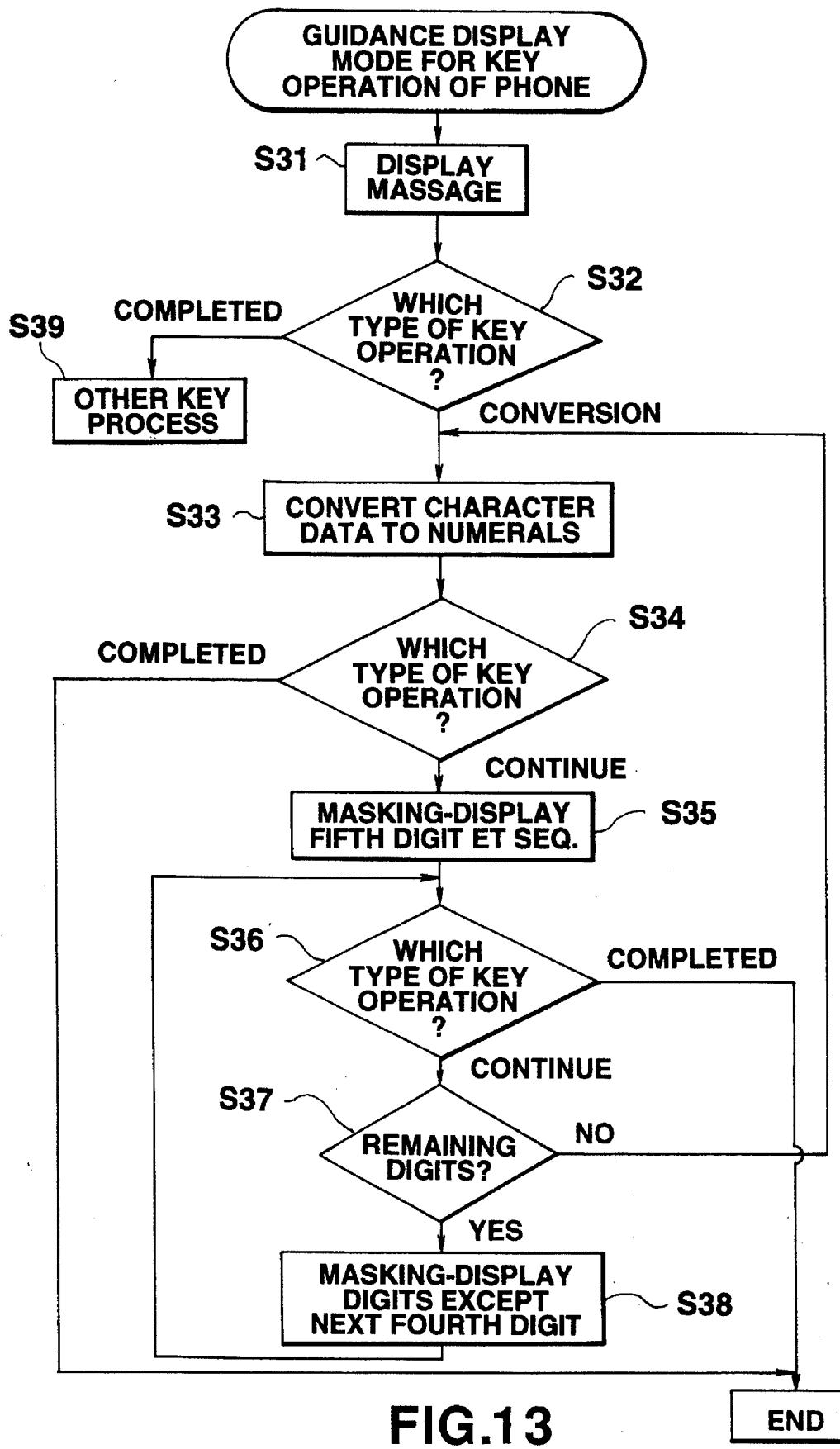
FIG. 13 is a flowchart showing the data input guidance display process effected by the pager of the first embodiment.
Figure 14:
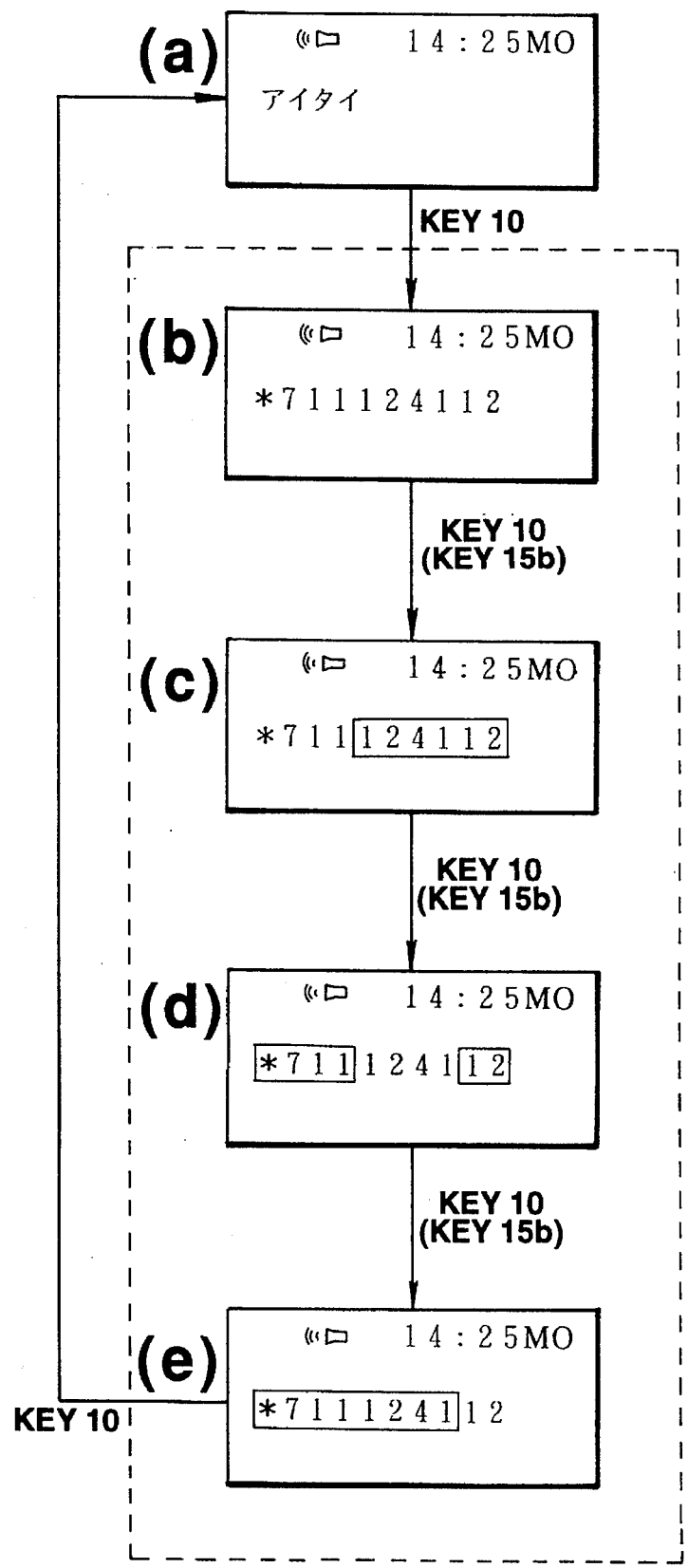
FIG. 14 is a diagram showing an example of an input guidance display of message information displayed on a liquid crystal display section by the message information and telephone number information processing operations of FIG. 9.

FIG. 13 is a flowchart for illustrating the key operation input guidance display process of the key telephone effected by use of the pager of the first embodiment. FIG. 14 is a diagram showing examples of display on the liquid crystal display section 39 based on the input guidance display process shown in FIG. 13. If an input instruction of the execution key 10 is supplied from the key input section 25 while the message information to-be-transmitted is displayed on the display unit 39 (step S31), the CPU 26 determines the input instruction in the step S32 and executes the key operation guidance display process of the key telephones. After completing the message input forming process described with reference to FIGS. 11 and 12 when the execution key 10 is operated while the character data "アイヤイ", for example, as shown in FIG. 14(a) is displayed on the liquid crystal display section 39, the input character data "アイヤイ" is automatically converted into the numeric data "1112412" based on the matrix character arrangement table of the conversion table 27 shown in FIG. 4 and the numeric data "7" is added to the head of the numeric data, transmissible numeric data "*711124112" is displayed, as shown in FIG. 14(b) (step S33). Then, it is discriminated again whether the completion by the return key 7 or the continuation by the execution key 10 is instructed (step S34). At the time of the completion of the key input, the process is ended. When the continuation is instructed, fifth digit et sequentes except for the first four figures of the numeric data are displayed in the masked state, as shown in FIG. 14(c) (step S35). After this, whether the key input is completed or continuously effected is checked again (step S36). At the time of the completion of the key input, the guidance display process is completed. At the time of the continuation of the key input, it is discriminated whether the remaining digits exist (step S37). If there is no remaining digits, the character data conversion process of the step S33 is effected again. When the remaining digits exist, numerals other than the next four digits of the displayed numeric data are displayed in the masked state, as shown in FIG. 14(d) (step S38) and then the key input checking process of the step S36 is effected again. The masking-display of the step S38 is repeatedly executed by every operation of the execution key 10 as long as there exits the remaining digits. In the step S32, if a key input except for the execution key 10 is discriminated, other key process corresponding to the operated key such as a process of the step S4 of FIG. 9, a process of the step S7, etc is performed (step S39). Thus, in the first embodiment, since the guidance display wherein predetermined digit number of the numeric data which is converted from the character data and which corresponds to the key operations of the push-phone is displayed on the liquid crystal display section 39, the user can transmit a message to a desired pager while confirming the input range of the numeric data simply by operating the push button of the push-phone based on the content of the key operation guidance display, the troublesome operation of operating numeric keys while referring to the conventional matrix character arrangement table can be omitted, occurrence of erroneous input operation can be suppressed, the operability and reliability at the time of numeric data input operation can be significantly enhanced, and the convenience of message service in the pager or the like can be enhanced. This guidance display function is especially useful for the apparatus which does not have the tone signal generator 35 of FIG. 2.

Figure 15:
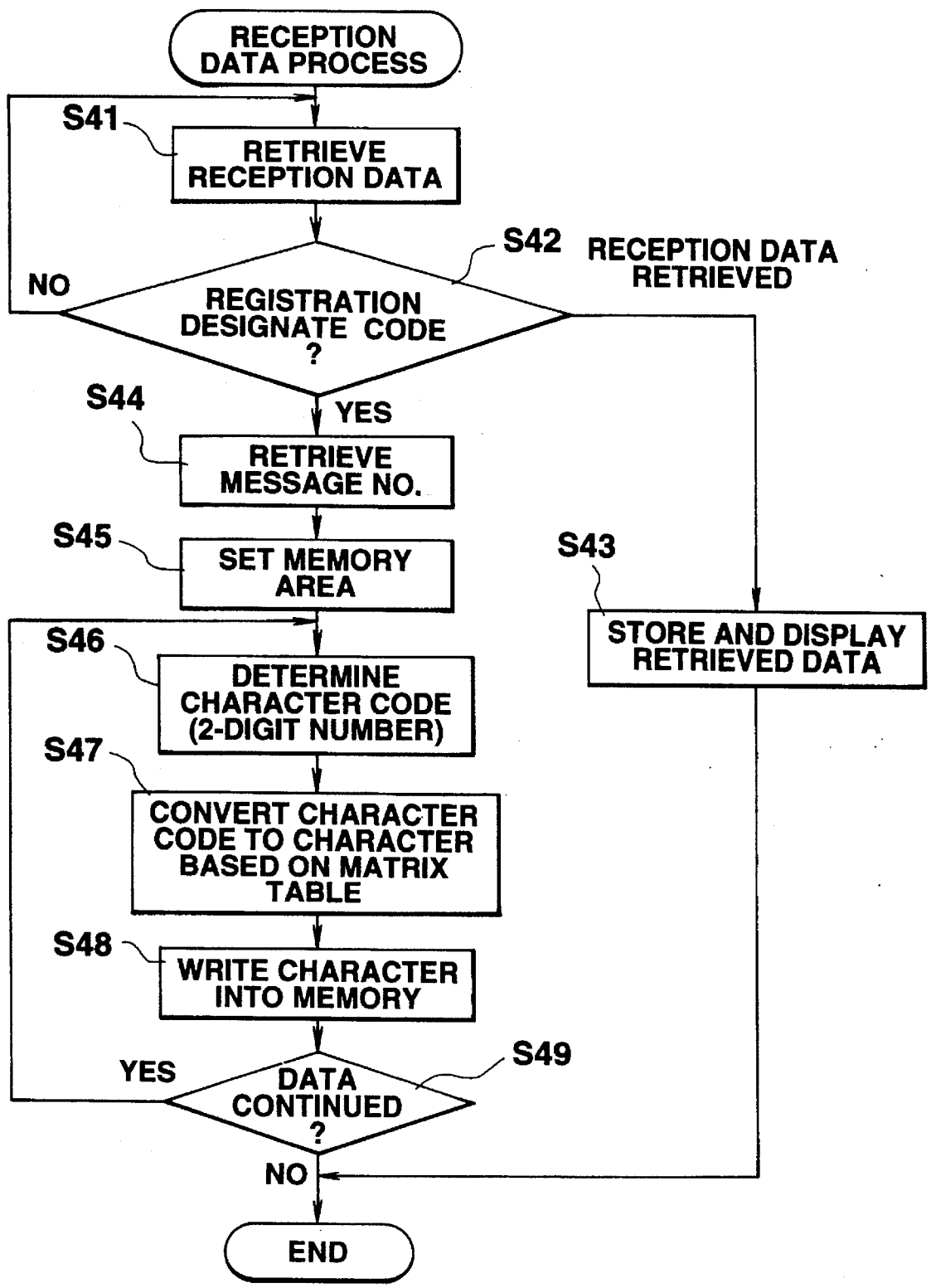
FIG. 15 is a flowchart showing the reception data process effected by the pager of the first embodiment.

FIG. 15 is a flowchart for illustrating the reception data process, especially, the received fixed-form message registration process, effected by the pager of the first embodiment. First, the decoder 23 detects reception of data to the pager 1 via the antenna 21 and the reception circuit 22, and the CPU 26 is informed of the data reception. The CPU 26 starts the reception data process, receives reception data decoded and input by the decoder 23, and retrieves the reception data (step S41). That is, the retrieval of transmission data following the call ID is started. It is retrieved whether the registration designate code of the transmission data shown in FIG. 7A is present (step S42). When the registration designate code is not present, the reception data retrieving process of the step S41 is effected. When the retrieval of the reception data is completed, the reception data is stored in the reception message memory 31 and the reception message is displayed on the display unit 39 for a predetermined period of time, and then the present process is completed (Step S43). On the other hand, when the registration designate code is present, the data registration mode is set and the message number is retrieved (step S44). The memory area for the message information of the message number is set into the fixed-form message storing portion 33c of the message memory 33 (step S45). Then, the character code data (two-digit numerals) is determined (step S46) and the character code data is inversely converted into character information based on the matrix character arrangement table shown in FIG. 4 stored in the inverse conversion table 28 (step S47). The character information is then stored into the memory area assigned to the message numbers set in the step S45 (step S48). Next, whether the reception data is continued is checked (step S49). If the reception data is continued, the process is returned to the step S46 to repeatedly effect the conversion process of the character code data. If the reception data is not continued, the present process is completed. In the reception data process, a message can be registered by freely setting a message number in the message memory 33 of the receiver side pager by transmitting a call signal including the message information in the transmission format shown in FIG. 7A from the transmitter side pager in the form of the DTMF signal from the handset of the telephone. Further, the message number of the message information may be set or may not be set in one-to-one correspondence to the memory area number of the fixed-form message storing portion 33C. More particularly, if the memory area number of the fixed-form message storing portion 33C is 20,100 numbers, i.e., "00" to "99" may be used as the message number. In the above explanation, the received message information is stored in the fixed-form message storing portion 33C, but the telephone number information can be registered in the TEL bank memory 34 by providing the telephone number information consisting of shortened number (message number), name and telephone number (and pager identification information) as the message information since the memory structure of the TEL bank memory 34 is similar to that of the fixed-form message storing portion 33C. Of course, in this case, either different numeral ranges of the message number or different registration designate codes must be used to discriminate whether the received message information is stored in either the message memory 33 (fixed-form message storing portion) or the TEL bank memory 34. Thus, the message information can be input in the form of character data, input character data can be converted into transmissible numeric data, and it is converted into the DTMF signal and output from the speaker 36 so that the message can be automatically transmitted to a pager of the destination side together with a call number by setting the pager 1 near the transmitter of the handset of the telephone and thus the auto-dialer function as well as the message automatic transmitting function can be attached to the pager 1.

Further, in the pager 1, the transmission function of converting the call number, registration designate code, message number and character code converted from the message into the corresponding DTMF signal according to the preset transmission data format and transmitting the same is provided. Also, the reception function of inversely converting the character code data into the character information based on the registration designate code and message number when receiving the transmission data and registering the converted character information into a designated memory area of the memory is provided. Therefore, a message can be transmitted to a pager of receiver side and the message can be freely registered simply by transmitting the DTMF signal from the handset of the telephone. As a result, highly excellent message transmitting/receiving function can be provided for the pager and more convenient communication service can be provided for the user using the pager.

Figure 16:
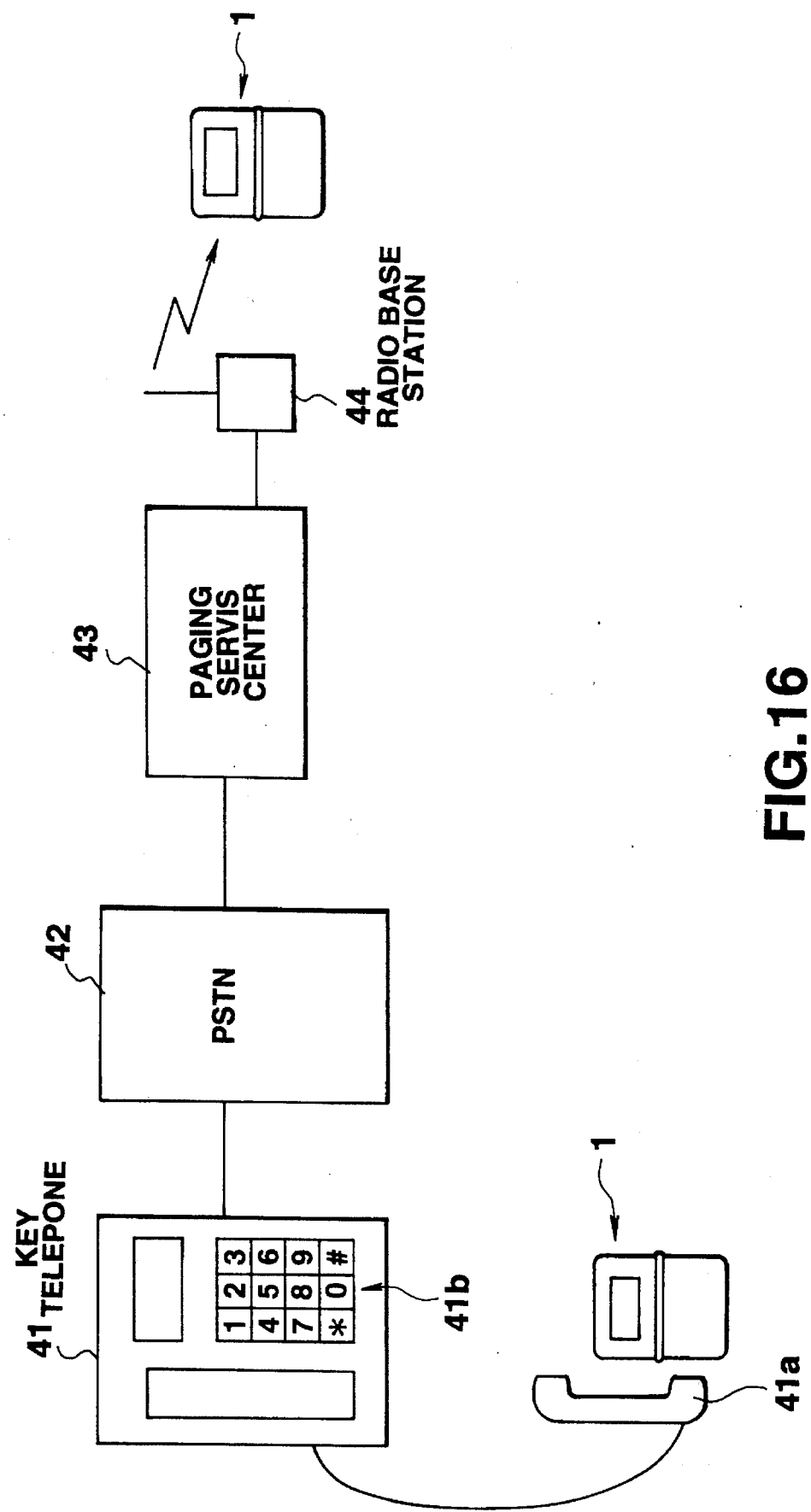
FIG. 16 is a view showing a system arrangement of a data communication system according to the first embodiment of the present invention.

FIG. 16 is a view showing a system arrangement of a data communication system according to the first embodiment of the present invention. The key telephone 41 which has a handset 41a and input keys 41b is connected to the paging service center 43 via a PSTN (Public Switched Telephone Network) 42. The paging service center 43 is equipped by a radio base station 44. A call number assigned to the pager 1 in the receiver side and the numeric data to be transmitted are input from the speaker 36 of the pager 1 in the transmitter side to the receiver of the handset 41a. The call number is directly input as the dial tone into the key telephone 41 without the operation of the push button keys 41b. The call number and the numeric data are transmitted via the PSTN 42 to the paging service center 43, and the radio base station 44 transmits the identification code and the numeric data through the radio system to the pager 1 in the receiver side. The transmitted numeric data is converted into the character data in the pager 1 of the received side and it is displayed on the liquid crystal display 39.

In the above embodiments, the conversion table 27 which converts the character data into the two-digit numeric data and the inverse conversion table 28 which converts the two-digit numeric data into the character data are provided as tables storing the matrix character arrangement table. However, only one character/numeral conversion table, for example, the inverse conversion table 28 can be provided since the bidirectional character/numeral conversion can be executed by means of the software processing of the CPU 26 using the one conversion table. Also, in the above embodiments, input character data are stored in the message memory 33 or the TEL bank memory 34, and are converted into the two-digit numeric data based on the conversion table 27 when the tone output is instructed by the dial key 3 and when character/numeral conversion is instructed by the execution key 10. However, when the character data is input, the two-digit numeric data corresponding to the input character can be stored in the message memory 33 or the TEL bank memory 34. In principle, the CPU 26 can be arranged to process only the numeric data, and the numeric data may be converted into the character data only when the data is displayed. In this case, it is of course that the steps S46 and S47 of the reception data process in FIG. 15 can be omitted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus comprising:
   inputting means for inputting alphanumeric character data representing a message to be transmitted;
   converting means for converting said alphanumeric character data input by said inputting means into first information indicating a series of key operations of a push-button telephone which must be operated by a user when inputting a message corresponding to said alphanumeric character data by said key operations of said push-button telephone connected to a public telephone network; and
   displaying means for displaying said first information indicating said series of key operations converted by said converting means.

2. A data processing apparatus according to claim 1, wherein said displaying means displays said first information while dividing a data display range into a plurality of preset data widths.

3. A data processing apparatus according to claim 1, wherein said displaying means displays said first information such that said first information is indicated by every predetermined amount of data.

4. A data processing apparatus according to claim 1, wherein said converting means comprises means for converting each alphanumeric character data representing a message to be transmitted input by said inputting means into two-digit numeric data.

5. A data processing apparatus according to claim 1, wherein said converting means includes means for producing second information indicating key operations of said push-button telephone which must be operated by a user when inputting an indicating code for indicating that following data is alphanumeric character data by said key operation of said push-button telephone, and for adding said second information to said first information.

6. A data processing apparatus according to claim 1, further comprising outputting means for outputting signals corresponding to said first information converted by said converting means.

7. A data processing apparatus according to claim 6, wherein said signals outputted by said outputting means comprise tone signals.

8. A data processing apparatus according to claim 1, further comprising means for outputting dial-tones corresponding to said first information converted by said converting means.

9. A data processing apparatus comprising:

inputting means for inputting alphanumeric character data representing a message to be transmitted;

storing means for storing said alphanumeric character data input by said inputting means;

converting means for converting said alphanumeric character data stored in said storing means into first information indicating a series of key operations of a push-button telephone which must be operated by a user when inputting a message corresponding to said alphanumeric character data by said key operations of said push-button telephone connected to a public telephone network; and displaying means for displaying said first information indicating said series of key operations converted by said converting means.

10. A data processing apparatus according to claim 9, wherein said displaying means displays said first information while dividing a data display range into a plurality of preset data widths.

11. A data processing apparatus according to claim 9, wherein said displaying means displays said first information such that said first information is indicated by every predetermined amount of data.

12. A data processing apparatus according to claim 9, wherein said converting means comprises means for converting each alphanumeric character data representing a message to be transmitted input by said inputting means into two-digit numeric data.

13. A data processing apparatus according to claim 9, wherein said converting means includes means for producing second information indicating key operations of said push-button telephone which must be operated by the user when inputting an indicating code for indicating that following data is alphanumeric character data by said key operation of said push-button telephone, and for adding said second information to said first information.

14. A data processing apparatus according to claim 9, further comprising outputting means for outputting signals corresponding to said first information converted by said converting means.

15. A data processing apparatus according to claim 14, wherein said signals outputted by said outputting means comprise tone signals.

16. A data processing apparatus according to claim 9, further comprising means for outputting dial-tones corresponding to said first information converted by said converting means.

17. A data processing apparatus comprising:

inputting means for inputting alphanumeric character data representing a message to be transmitted;

storing means for storing the alphanumeric character data input by said inputting means;

displaying means for displaying said alphanumeric character data stored in said storing means; and means for causing said displaying means to display first information indicating to a user, key operations of a push-button telephone corresponding to said alphanumeric character data stored in said storing means so as to input a message corresponding to said alphanumeric character data by the user performing said indicated key operations of said push-button telephone connected to a public telephone network means; and wherein said causing means includes converting means for converting said alphanumeric character data stored in said storing means into said first information indicating a series of key operations of the push-button telephone, based on a preset data conversion format.

18. A data processing apparatus according to claim 17, wherein said causing means includes means for causing said displaying means to display said first information such that said first information is indicated by every predetermined amount of data.

19. A data processing apparatus according to claim 17, wherein:

said causing means includes a manually operable key; and said converting means includes means for converting said alphanumeric character data stored in said storing means into said first information indicating the key operations of said push-button telephone based on a preset data conversion format when said manually operable key is operated.

20. A data processing apparatus according to claim 19, wherein said displaying means displays said first information such that said first information is indicated by every predetermined amount of data every time when said manually operable key is operated.

21. A data processing apparatus according to claim 19, wherein:

said causing means includes a second manually operable key; and said displaying means displays said first information such that said first information is indicated by every predetermined amount of data every time when said second manually operable key is operated.

22. A data processing apparatus according to claim 17, wherein said converting means comprises means for converting each alphanumeric character data stored in said storing means into two-digit numeric data.

23. A data processing apparatus according to claim 17, wherein said converting means includes means for producing second information indicating key operations of said push-button telephone which must be operated by the user when inputting an indicating code for indicating that following data is alphanumeric character data by said key operation of said push-button telephone, and for adding said second information to said first information.

24. A data processing apparatus according to claim 17, further comprising outputting means for outputting signals corresponding to said first information converted by said converting means.

25. A data processing apparatus according to claim 24, wherein said signals outputted by said outputting means comprise tone signals.

26. A data processing apparatus according to claim 17, further comprising means for outputting dial-tones corresponding to said first information converted by said converting means.

* * * * *